United States Patent Office

3,795,675
Patented Mar. 5, 1974

3,795,675
PAPAVEROLINE SULFONIC ACID MONO-
HYDRATE AND SALTS
Umberto Laguzzi, 52 Via Cadore, Milan, Italy
No Drawing. Filed Feb. 4, 1971, Ser. No. 112,805
Claims priority, application Italy, Sept. 15, 1970,
29,749/70
Int. Cl. C07d 35/28
U.S. Cl. 260—283 S          2 Claims

ABSTRACT OF THE DISCLOSURE

Papaveroline sulfonic acid monohydrate of empirical formula $(C_{16}H_{12}NO_4)SO_3H.H_2O$ and its sodium and N-methylglucamine salts are described. They are particularly valuable in the therapy of particular arteriopathic disturbances, because they retain the physiological and clinical properties of papaveroline and yet are water soluble.

---

This invention relates to a new papaveroline derivative and related preparation processes.

More specifically, this invention relates to a new papaverolinic derivative, showing effective pharmacological properties and capable of being solubilized.

As it is well known, the papaveroline derives from the full demethylation of papaverine.

It is a tetraphenol being easily oxidizable, insoluble in water and in the most part of solvents, soluble in dimethylsulfoxide and dimethylformamide and in acetic, formic, sulphuric, trichloroacetic acids, as well as in sodium hydroxide, N-methylglucamine, ethyl and methylamine etc.

In the therapy of particular arteriopathic forms, aqueous solutions, administered by mouth, but above all administered by parenteral, intravenous, endomuscular and endoarterial way, have shown a marked activity.

Nevertheless, the insolubility of papaveroline in water and in common non-toxic solvents has constantly restricted its application.

It is in fact scarcely possible to administer papaveroline in solution in dimethylsulfoxide or dimethylformamide, even if they may be diluted with little water in view of the toxicity of the solvents; furthermore, in most diluted solutions, the product precipitates.

On the other hand, the solutions in acids or alkalis cannot bring about a satisfactory solution of the problem, because by using the acids, solutions are obtained having a pH being equal to 0 or 1 and of rather a caustic nature.

The solutions in alkalis are instead quickly liable to alteration, they take on a blackish coloring, have a high viscosity and a pH not under 11.

Furthermore, in either case the obtainable papaveroline concentrations have no therapeutical significance.

After long investigations it was found that the aforementioned inconveniences may be remedied by using the papaveroline sulphonic mono-hydrate acid, having the following empirical formula:

$$(C_{16}H_{12}NO_4)SO_3H.H_2O$$

Said compound in form of one of its salts, and particularly in form of a salt of a metal or N-methylglucamine is soluble in water.

It should be stressed here that, unlike other compounds of this kind, the introduction of the sulphonic group (—$SO_3H$) in the molecule of the papaveroline does not involve important deviations from its pharmacological, physiological and clinical properties.

The papaverolin-sulphonic acid to the following general formula:

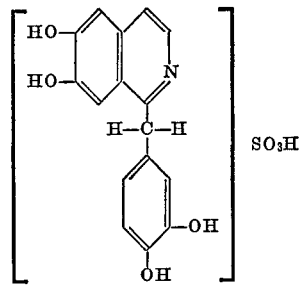

may be obtained through direct sulphonation of the papaveroline with a suphonating agent, which may be monohydrate sulphuric acid or with different $SO_3$ concentrations or the chloro-sulphonic acid or a mixture of both in any ratio.

The sulphonation reaction is slightly exothermic and preferably takes place at a temperature of 50–70° C. by direct admission of the papaveroline in the monohydrate sulphuric acid or chlorosulphonic acid.

The sulphonation mass allows the sulphonic product to separate by appropriate dilution with warm water.

The separated water-washed panel is perfectly soluble in a sodium bicarbonate solution; the solution reaches a pH equal to 7.2–7.3.

From the solution of the sodium papaverolinmonosulphonate the papaverolin-sulphonic acid may be precipitated with acetic in warm condition.

The sulphonic compound, separated, washed and dried was recognized through the well-known papaveroline assays and quantitatively determined by spectrophotometrical way.

In order to learn more about any changes in the constitution of the sulphonic derivative relative to papaveroline, said compound was subjected to the following examination: centesimal composition, N.M.R., I.R., acetylation, etc.

The pharmacological tests have been carried out on the aqueous solutions with different concentrations, on the sodium and N-methylglucamine salt.

The sulphonic solubilization is obtained with a quantity of alkalis corresponding to the stoichiometric ratio, namely, the sulphonic compound has the behavior of a monobasic acid.

The pharmacological tests derived from the aqueous papaveroline suspensions and the aqueous solutions, obtained with N-methyl glucamine in great excess, whereas they qualitatively turned out in all superimposable to the pharmacological tests carried out on the aqueous solutions of N-methylglucamine papaverolinmonosulphonate, by taking, of course, into account the respective molecular weights, they are quantitatively diversified. That is to say, the introduction of the sulphonic group in the papaveroline, while not affecting the action mechanism and the overall action, imparts a higher activity to the molecule itself.

This higher activity derives almost certainly from the fact that while the papaveroline aqueous solutions, obtained with a great excess of N-methylglucamine precipitate by slight displacements of the pH or by slight dilutions, the aqueous solutions of the papaverolinmonosulphonic salts are stable through wide pH values and do not precipitate in any dilution whatever.

The pharmacological tests carried out are: $DL_{50}$, partial and total, central and peripheral vascular resistances, coronary artery, brain, iliac artery, mesenteric, renal flows, diastole and systole pressure values, aorta flow; acute toxicity, chronic toxicity.

The solutions of N-methylglucamine papaverolinmonosulphonate of 5-10% by weight, expressed in terms of the papaverolinmonosulphonic acid, have a pH most close to neutrality, are slightly hypertonic, more stable relative to the atmospheric oxygen than the papaveroline alkaline aqueous solutions, do not take on blackish colorings proper of the papaveroline alkaline aqueous solutions, they are of a slightly straw-yellow color, and, if stored suitably protected from the air and light, they do not undergo appreciable chromatic alterations in the presence of small quantities of 1-ascorbic acid.

The endomuscular and intravenous introduction, and above all the subcutaneous introduction of said solutions did not give rise to any local or general reactive fact.

It should be concluded, therefore, that the introduction of the sulphonic radical in the molecule represents a satisfactory solution of the problem, inasmuch as it permits to prepare papaveroline aqueous solutions, which may be easily administered by parenteral and oral way.

The physical and chemical characteristics of the sulphonic compound or the pharmacological tests lead to the conclusion that the obtained molecule differs from the basic papaveroline only because it has the behavior of a monobasic acid and forms soluble and stable salts.

In order to better illustrate the inventive conception of the present invention and to put into effect, the following non-limiting examples are provided.

EXAMPLE 1

In a 3-neck 6000 ml. capacity flask, provided with fast central stirrer, thermometric case and loading hopper are loaded: 7085 g. 100% sulphuric acid, and from the loading hopper, little by little, in about 3 hours, and under stirring 1417 g. (5 mols) basic papaveroline, calculated at 100%.

The temperature is maintained at a value not exceeding 60°.

Subsequently, the reaction mass is kept under stirring, at the room temperature for about 10 hours.

The reaction mass discharges then slowly through a cock funnel into a glass 40 litre capacity flask, containing about 30 l. distilled water at 70-90° by continuous stirring.

The thus obtained papaverolin-sulphonic acid is separated by filtering under vacuum at 50-60° C.

The panel is then properly washed until a colorless filtrate, is obtained; is suspended in 3000 ml. water at the temperature of 70-80° and is cold treated with a saturated sodium bicarbonate solution until obtaining a pH of 7.2-7.3 on b.m. and under stirring.

In this manner, the papaverolin-sulphonic acid salifies and converts into solution; then the solution is filtered and the filtrate is transferred into a 40 litre capacity flask, container 30 l. water at 80-90°.

Under stirring, the solution is acidified with warm glacial acetic acid, until reaching a pH of 4÷5.

It is then filtered, washed until the ions acetate and sulphate disappear from the washing water, and the product is dried under vacuum.

Thus 1840 g. monohydrate papaverolinmonosulphonic acid with the titer 99.6% are obtained, corresponding to 1832 g. with the titer 100%; hence, the yield is of 96%.

Physical and chemical characteristics

The thus obtained product is in form of a clear microcrystalline powder, being scarcely soluble in water and organic solvents. The compound has an acid character being more accentuated than papaveroline, in that it dissolves also in the acid sodium carbonate with development of $CO_2$ unlike what occurs with papaveroline.

The neutral solutions and still more the alkaline solutions absorb the atmospheric oxygen, taking on a dark color until giving black solutions, this being a typical characteristic of the orthodiphenolic compounds.

The oxidation may be delayed or prevented by the 1-ascorbic acid.

As a result of heating, the matter decomposes without melting at temperatures over 300° C.

Elementary analysis

The material, stove dried at 110°, until a constant weight, has given the following analytical values:

Found: C, 50.37%; H, 3.95%; N, 3.50%; S, 8.39% corresponding to an empirical formula $C_{16}H_{13}O_7NH.H_2O$.

The calculated values are: C, 50.40%; H, 3.95%; N, 3.67%; S, 8.32%, namely in excellent agreement with the experimental values.

The presence of crystallization water is assumed from the weight loss at 150° in the vacuum. A weight reduction is thus obtained, being close to the theoretical one.

The obtained anhydrous product quickly reabsorbs moisture when exposed to the air until the value corresponding to the monohydrate is reached.

Chemical structure

The analytical values of the compound under examination are a priori compatible with both acid papaveroline sulphate and a structure carrying an esterified phenol-hydroxyl group with a mol of sulphuric acid and finally with a sulphonic acid, carrying the group $-SO_3H$, in one of the eight free annular positions of the benzyl-isoquinolinic ring.

The two former assumptions should be discarded for chemical and chemical-physical reasons.

There is no question that the compound is not the acid papaveroline sulfate and this is proven by the solubility in $NaHCO_3$ of the compound, since the treatment of the acid papaveroline solutions with $NaHCO_3$ leads instead to the precipitation of this tetraphenol.

Also the structure of sulphuric ester on a phenol function is to be excluded in view of the impossibility of hydrolytically detaching the group $-SO_3H$ with both alkalis and acids; and the same conclusion finds confirmation in obtaining a tetraacetyl derivative.

There remains, therefore, by exclusion the only latter alternative.

In regard to the attachment position of the group $-SO_3H$ to the benzyl ring, it is thought and such interpretation is not to be considered in a limiting sense in relation to the present invention, that said group binds in position 6' of the benzyl ring.

Consequently, most probably and without limitation to the compound subject of the present invention appertains the structure of 6,7-dioxy-1-(3',4'-dioxybenzyl)-isoquinolin-6' sulphonic acid, i.e.:

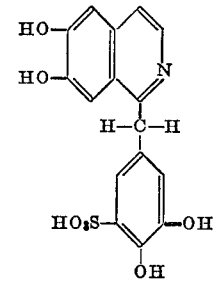

Empirical formula:

$(C_{16}H_{12}NO_4)SO_3H.H_2O$—P.M.=381.37

Basic papaveroline: 74.32%.

Spectral characteristics

The compound shows in HCl 1 N a significant maximum at 251 nm., practically coinciding with the one shown by the basic papaveroline with $$E^{1\%}_{1\,cm.} = 1626$$

which indicates that the chromophoric system does not undergo changes in the sulphonation process. The presence of the absorption maximum in U.V. ensures, as it is obvious, to effect a dosage of the compound by spectrophotometric way under controlled pH conditions.

Spectrum I.R.

The spectrum I.R. in suspension (Nujol) of both the product and its tetra-acetyl derivative shows two absorption areas between 1230–1110 cm.$^{-1}$ and 1070–1020 cm.$^{-1}$, corresponding to the presence of the sulphonic group.

Spectra N.M.R.

They have been identified in dimethylsulfoxide. They are complicated and of difficult interpretation due to the interference provoked by the hydroxyl groups, falling into the aromatic proton area.

The examination of the spectrum N.M.R. of the tetra-acetyl derivative, while still being complicated, clearly indicates a methyl proton to aromatic proton ratio being in agreement with its tetra-acetate structure.

EXAMPLE 2

In a 10 litre capacity flask, provided with central stirrer, vertical refrigerator, thermometric case and loading hopper are loaded: 7100 g. chlorosulphonic acid calculated on 100%, and under stirring, slowly in about 4 hours, 1418 g. basic papaveroline, calculated on 100%.

The temperature should not exceed the 50–60°. When all the papaveroline has been added, leave under stirring for about 6 hours.

The sulphonation mass is caused to flow by carefully operating into a 40 litre capacity flask with central stirrer, containing about 30 l. water.

The papaverolin-sulphonic acid precipitates, and is then filtered and washed. The washed panel is treated in a 20 litre capacity flask with about 10 l. water under stirring at 50–60° and a saturated sodium bicarbonate solution is slowly added until a pH of 7.2–7.3 is obtained.

The sulphonic compound goes into a solution, it is filtered and the filtrate is transferred into a 40 liter capacity flask, containing about 20 l. warm water at 80–90°.

Under stirring, the solution is acidified with warm glacial acetic acid, the sulphonic compound precipitates, and it is filtered and washed until the sulphuric and acetic ions disappear from the filtrate.

The panel is dried and weighed. The yield is approximately similar to that obtained in Example 1.

The elementary analysis of the compound, stove dried at 110° C., until constant weight, has given values being closely analogous to those obtained with the product of Example 1.

The papaveroline sulphonation may be also carried out with a mixture of chloro-sulphonic acid and sulphuric acid and any ratio whatever. It is thought that such iinterpretation is rather hypothetical and nonlimiting of this invention, the reaction mechanism being the following:

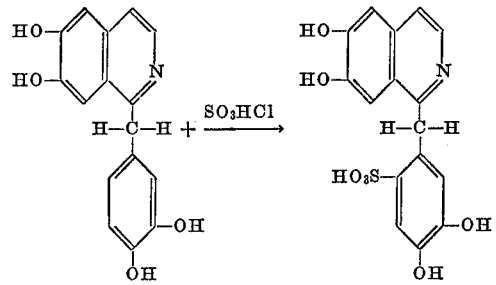

What I claim is:

1. Papaveroline sulfonic acid monohydrate of empirical formula $$(C_{16}H_{12}NO_4)SO_3H \cdot H_2O$$

and N-methylglucamine salt thereof.

2. The papaveroline sulfonic acid monohydrate according to claim 1 wherein the sulfonic group is in the 6-position of the benzyl group in said papaveroline compound and N-methylglucamine salt thereof.

References Cited

UNITED STATES PATENTS 2,290,846   7/1942   Ellis _____ 260—283 S

FOREIGN PATENTS 203,687   9/1967   U.S.S.R. _____ 260—283

OTHER REFERENCES

R. Kitasato et al. in Chem. Abstr., vol. 25, col. 1532 (1931).

Goto et al.: Ber., vol. 63B, pp. 2696–99 (1930).

DONALD G. DAUS, Primary Examiner

U.S. Cl. X.R.

260—286 R, 289 A, 686; 424—258